United States Patent
Shuto et al.

(10) Patent No.: US 11,608,798 B2
(45) Date of Patent: Mar. 21, 2023

(54) GAS ENGINE AND SHIP PROVIDED WITH SAME

(71) Applicant: MITSUBISHI HEAVY INDUSTRIES ENGINE & TURBOCHARGER, LTD., Sagamihara (JP)

(72) Inventors: Shintaro Shuto, Tokyo (JP); Satoshi Yamada, Tokyo (JP); Kazuro Hotta, Tokyo (JP); Tomohiro Noguchi, Kanagawa (JP); Kenichi Iizuka, Kanagawa (JP); Yuki Nakamura, Kanagawa (JP)

(73) Assignee: MITSUBISHI HEAVY INDUSTRIES ENGINE & TURBOCHARGER LTD, Sagamihara (JP)

( * ) Notice: Subject to any disclaimer, the term of this patent is extended or adjusted under 35 U.S.C. 154(b) by 167 days.

(21) Appl. No.: 16/958,101

(22) PCT Filed: Jul. 25, 2018

(86) PCT No.: PCT/JP2018/027893
§ 371 (c)(1),
(2) Date: Jun. 25, 2020

(87) PCT Pub. No.: WO2019/176128
PCT Pub. Date: Sep. 19, 2019

(65) Prior Publication Data
US 2020/0340428 A1    Oct. 29, 2020

(30) Foreign Application Priority Data
Mar. 16, 2018    (JP) .............................. JP2018-049229

(51) Int. Cl.
*F02M 61/18* (2006.01)
*F02M 21/02* (2006.01)
(Continued)

(52) U.S. Cl.
CPC ............. *F02M 21/02* (2013.01); *B63H 21/00* (2013.01); *F02M 61/04* (2013.01); *F02M 61/18* (2013.01); *F02M 69/00* (2013.01)

(58) Field of Classification Search
CPC .. F02M 21/02; F02M 21/042; F02M 21/0281; F02M 21/0278; F02M 61/04;
(Continued)

(56) References Cited

U.S. PATENT DOCUMENTS 4,877,004 A * 10/1989 Nishizawa ........... F02M 69/044
123/308
7,195,000 B2 * 3/2007 Kayama ............... F02M 61/145
123/308

(Continued)

FOREIGN PATENT DOCUMENTS

JP    3-185266 A    8/1991
JP    6-173828 A    6/1994
(Continued)

OTHER PUBLICATIONS

Extended European Search Report for European Application No. 18909690.2, dated Oct. 27, 2020.
(Continued)

*Primary Examiner* — Hai H Huynh
(74) *Attorney, Agent, or Firm* — Birch, Stewart, Kolasch & Birch, LLP (57) ABSTRACT

The purpose of the present invention is to provide a gas engine and a ship provided with the same, the gas engine making it is possible to ensure a distance that enables fuel and an oxidizing agent to mix, and to evenly mix the oxidizing agent and the fuel even if the flow rate of gas traveling towards intake pipes varies. A gas engine (1) comprises: an intake passage (10) through which a gas flows; a plurality of intake pipes (12A, 12B) where the
(Continued)

intake passage (10) branches apart at a branching section (14) that is downstream in the gas flow direction, the intake pipes opening to a cylinder (16) at the downstream end; and a fuel injection means (31) that injects fuel into the intake passage (10). The fuel injection means (31) is provided upstream of the branching section (14) in the gas flow direction, and injects varying quantities of fuel into the plurality of intake pipes (12A, 12B).

11 Claims, 8 Drawing Sheets

(51) Int. Cl.
    *B63H 21/00* (2006.01)
    *F02M 61/04* (2006.01)
    *F02M 69/00* (2006.01)

(58) Field of Classification Search
    CPC .. F02M 61/18; F02M 69/00; F02M 35/10216; F02M 35/165; B63H 21/00; F02B 43/00; F02B 1/04; Y02T 10/30
    USPC .......................................... 123/302, 308, 470
    See application file for complete search history.

(56) References Cited

U.S. PATENT DOCUMENTS

| | | |
|---|---|---|
| 2005/0235961 A1 | 10/2005 | Kayama et al. |
| 2009/0126691 A1 | 5/2009 | Bach |

FOREIGN PATENT DOCUMENTS

| | | |
|---|---|---|
| JP | 10-47166 A | 2/1998 |
| JP | 2003-97359 A | 4/2003 |
| JP | 2005-307904 A | 11/2005 |
| JP | 2008-75642 A | 4/2008 |
| JP | 2008-138565 A | 6/2008 |
| JP | 2008-202463 A | 9/2008 |
| JP | 2017-133491 A | 8/2017 |
| WO | WO 2004/106722 A2 | 12/2004 |

OTHER PUBLICATIONS

International Search Report for International Application No. PCT/JP2018/027893, dated Oct. 2, 2018, with an English translation.
Written Opinion of the International Searching Authority for International Application No. PCT/JP2018/027893, dated Oct. 2, 2018, with an English translation.
Office Action for Japanese Patent Application No. 2021-112747, dated Jun. 21, 2022, with English translation.

\* cited by examiner

GAS ENGINE AND SHIP PROVIDED WITH SAME

TECHNICAL FIELD

The present invention relates to a gas engine and a ship provided with the gas engine.

BACKGROUND ART

In a gas engine, in order to combust fuel gas and air in a uniformly mixed state, the fuel gas is supplied to a front part of a turbocharger located upstream of a cylinder. In some cases, the fuel gas and the air are mixed with each other in advance.

In a case where the above-described gas engine is used as a shipboard gas engine, in view of safety such as explosion-proof, a fuel gas system needs to be provided with a double pipe. In a case where the fuel gas is supplied to the front part of the turbocharger, the whole gas engine needs to be provided with the double pipe. Consequently, there is a problem of a large-scale apparatus and increasing cost.

As in PTL 1, a fuel gas jetting nozzle having a plurality of openings is disposed in each of a plurality of air channels disposed in front of an intake valve of a cylinder. In this manner, it is possible to settle the problem of the large-scale apparatus and the increasing cost.

CITATION LIST

Patent Literature

[PTL 1] Japanese Unexamined Patent Application Publication No. 2008-138565

SUMMARY OF INVENTION

Technical Problem

However, according to PTL 1, a distance from a fuel gas supply source to the cylinder is short. Therefore, there is a possibility that the fuel gas and the air may not be sufficiently mixed. In addition, in a case where a flow speed of the gas flowing in each air channel varies in each air channel, concentration of the fuel gas with respect to the air is not uniform in each air channel. Therefore, there is a possibility that the air and the fuel gas may not be uniformly combusted inside the cylinder. In a case where the fuel gas and the air are not sufficiently mixed with each other or the concentration of the fuel gas is not uniform in each air channel, when the fuel gas is ignited inside the cylinder, there is a possibility of phenomena such as NOx generation, knocking generation, and an increase in non-combusted fuel gas.

The present invention is made in view of the above-described circumstances, and aims to provide a gas engine and a ship provided with the gas engine, in which a distance is secured so that fuel and oxygen containing gas can be mixed with each other, and furthermore, the oxygen containing gas and the fuel can be uniformly mixed with each other even in a case where a flow speed of the gas flowing toward each intake pipe varies.

Solution to Problem

In order to solve the above-described problems, a gas engine according to the present invention and a ship provided with the gas engine adopt the following means.

That is, according to an aspect of the present invention, there is provided a gas engine including an intake air channel through which gas flows, a plurality of intake pipes in which the intake air channel is branched at a branching portion located downstream in a gas flow direction and is open to a cylinder in a downstream end, and fuel jetting means for jetting fuel into the intake air channel. The fuel jetting means is disposed upstream of the branching portion in the gas flow direction, and jets different amounts of the fuel into the plurality of intake pipes.

In the gas engine according to the aspect, the fuel jetting means is disposed upstream of the branching portion in the gas flow direction. According to this configuration, compared to a case where the fuel is jetted to the intake pipe located downstream of the intake air channel, a distance in which the fuel (for example, fuel gas) and the oxygen containing gas (for example, air) can be mixed with each other is lengthened. Therefore, the oxygen containing gas and the fuel are uniformly and easily mixed with each other.

In addition, the fuel jetting means can jet respectively different amounts of the fuel to the plurality of intake pipes. According to this configuration, for example, the amount of the fuel is increased for the intake pipe having a high flow speed of the gas (for example, mixed gas of the air and the fuel gas), and the amount of the fuel is decreased for the intake pipe having a slow flow speed of the gas. In this manner, even in a case where the flow speeds of the gas directed toward the respective intake pipes are different from each other, fuel concentration of the mixed gas to be supplied into the cylinder (combustion chamber) via the respective intake pipes can be uniform regardless of the intake pipes. Therefore, the mixed gas of the oxygen containing gas and the fuel can be uniformly combusted in the combustion chamber. In this manner, it is possible to suppress phenomena such as NOx generation, knocking generation, and an increase in non-combusted fuel gas.

In addition, in the gas engine according to the aspect of the present invention, the fuel jetting means may include a single jetting pipe having a plurality of jetting ports, one or more jetting ports out of the plurality of jetting ports may be formed in each of a plurality of directions, and a total area of the one or more jetting ports directed in a direction toward one of the intake pipes may be different from a total area of the one or more jetting ports directed toward the other of the intake pipes.

According to the gas engine in the aspect, the total area of the jetting ports directed in the direction toward one of the intake pipes is different from the total area of the jetting ports directed in the direction toward the other of the intake pipes. Therefore, the amount of the fuel to be supplied can be adjusted in each of the plurality of directions (for each of the plurality of intake pipes). For example, the amount of the fuel can be increased for the intake pipe having the fast flow speed of the gas (for example, the mixed gas of the oxygen containing gas such as the air and the fuel gas), and the amount of the fuel can be decreased for the intake pipe having the slow flow speed of the gas.

In addition, in the gas engine according to the aspect of the present invention, in the plurality of jetting ports belonging to the jetting pipe, each area of the one or more jetting ports directed in the direction toward one of the intake pipe having the same area may be different from each area of the one or more jetting ports directed in the direction toward the other of the intake pipe having the same area.

According to the gas engine in the aspect, the total areas of the jetting ports formed in the respective directions can be different from each other. For example, in a case where there are two intake pipes (that is, in a case where the number of directions toward the intake pipes is two), and in a case where the number of jetting ports directed in the respective directions is the same (for example, three), when all of the areas of the jetting ports in the direction toward one of the intake pipes are respectively set to 1 and all of the areas of the jetting ports in the direction toward the other of the intake pipes are respectively set to 2, the total area of the jetting ports directed in the direction toward one of the intake pipes can be set to 3, and the total area of the jetting ports directed in the direction toward the other of the intake pipes can be set to 6.

In addition, in the gas engine according to the aspect of the present invention, the plurality of jetting ports belonging to the jetting pipe may have the same area, and the number of the one or more jetting ports directed in the direction toward one of the intake pipes may be different from the number of the one or more jetting ports directed in the direction toward the other of the intake pipes.

According to the gas engine in the aspect, the total areas of the jetting ports formed in the respective directions can be different from each other. For example, in a case where there are two intake pipes (that is, in a case where the number of directions is two), and in a case where the areas of all of the jetting ports are the same as each other (for example, are set to 1), when the number of the jetting ports in the direction toward one of the intake pipes is set to 3 and the number of the jetting ports in the direction toward the other of the intake pipes is set to 2, the total area of the jetting ports directed in the direction toward one of the intake pipes can be set to 3, and the total area of the jetting ports directed in the direction toward the other of the intake pipes can be set to 2.

In addition, in the gas engine according to the aspect of the present invention, the jetting pipe may be disposed to be close to a gas flow having a high flow speed, out of gas flows respectively directed to the plurality of intake pipes.

According to the gas engine in the aspect, the amount of the fuel jetted in the respective directions can be adjusted by disposing the jetting pipes. For example, the jetting pipe is disposed close to the gas flow having the high flow speed, out of the gas flows directed toward the plurality of intake pipes. In this manner, the amount of the fuel can be increased for the intake pipe having the high flow speed of the gas, and the amount of the fuel can be decreased for the intake pipe having the low flow speed of the gas.

In addition, in the gas engine according to the aspect of the present invention, the fuel jetting means may include one jetting pipe having a plurality of jetting ports. The jetting pipe may be disposed to be close to a gas flow having a high flow speed, out of gas flows respectively directed to the plurality of intake pipes.

According to the gas engine in the aspect, the amount of the fuel jetted in the respective directions can be adjusted by disposing the jetting pipes. For example, the jetting pipe is disposed close to the gas flow having the high flow speed, out of the gas flows directed toward the plurality of intake pipes. In this manner, the amount of the fuel can be increased for the intake pipe having the high flow speed of the gas, and the amount of the fuel can be decreased for the intake pipe having the low flow speed of the gas. In this manner, even in a case where the flow speeds of the gas directed toward the respective intake pipes are different from each other, fuel concentration of the mixed gas to be supplied into the cylinder (combustion chamber) via the respective intake pipes can be uniform regardless of the intake pipes. Therefore, the mixed gas of the oxygen containing gas and the fuel can be uniformly combusted in the combustion chamber. In this manner, it is possible to suppress phenomena such as NOx generation, knocking generation, and an increase in non-combusted fuel gas.

In addition, in the gas engine according to the aspect of the present invention, the fuel jetting means may include a rotation mechanism configured to rotate the jetting pipe around an axis.

In the gas engine according to the aspect, the fuel jetting means includes the rotation mechanism configured to rotate the jetting pipe around the axis. According to this configuration, the amount of the fuel to be supplied in the respective directions can be adjusted by rotating the jetting pipe. In this manner, the fuel can be jetted in an optimum direction that promotes the oxygen containing gas and the fuel to be mixed with each other. In this case, a rotation angle of the jetting pipe may be determined in accordance with an output of the gas engine or a change in the rotation speed. For example, the rotation angle of the jetting pipe is determined, based on a map prepared from data obtained in advance by an experiment (for example, the output and the rotation speed are set as parameters).

In addition, in the gas engine according to the aspect of the present invention, the plurality of jetting ports may be formed toward a downstream side in the gas flow direction.

According to the gas engine in the aspect, when the gas engine has a low output, even in a case where the gas flows rearward from the cylinder side, the fuel to be jetted from the plurality of jetting ports is not jetted to the upstream side of the gas. Therefore, the fuel jetted from the plurality of jetting ports are less likely to flow rearward. In this manner, it is possible to prevent the fuel from flowing rearward to a side of an intercooler installed on the downstream of the gas.

In addition, according to another aspect of the present invention, there is provided a gas engine including an intake air channel through which gas flows, a plurality of intake pipes in which the intake air channel is branched in a downstream branching portion in a gas flow direction and is open to a cylinder in a downstream end, and fuel jetting means for jetting fuel into the intake air channel. The fuel jetting means is disposed upstream of the branching portion in the gas flow direction, and jets the fuel into the plurality of intake pipes.

In the gas engine according to the aspect, the fuel jetting means is disposed upstream of the branching portion in the gas flow direction. According to this configuration, compared to a case where the fuel is jetted to the intake pipe located downstream of the intake air channel, a distance in which the fuel (for example, fuel gas) and the oxygen containing gas (for example, air) can be mixed with each other is lengthened. Therefore, the oxygen containing gas and the fuel are uniformly and easily mixed with each other. In this manner, the mixed gas of the oxygen containing gas and the fuel can be uniformly combusted in the combustion chamber. Therefore, it is possible to suppress phenomena such as NOx generation, knocking generation, and an increase in non-combusted fuel gas.

According to still another aspect of the present invention, there is provided a ship including the gas engine.

Advantageous Effects of Invention

According to the present invention, it is possible to provide the gas engine and the ship provided with the gas engine, which can secure the distance enabling the fuel and the oxygen containing gas to be mixed with each other, and which can uniformly mix the oxygen containing gas and the fuel with each other, even in a case where the flow speeds of the gas directed toward the respective intake pipes are different from each other.

DESCRIPTION OF EMBODIMENTS

Hereinafter, a gas engine according to an embodiment of the present invention will be described with reference to FIGS. 1 to 9.

First Embodiment

Hereinafter, a gas engine according to a first embodiment of the present invention will be described with reference to FIGS. 1 to 5.

First, a configuration of a gas engine 1 will be described.

Figure 1:
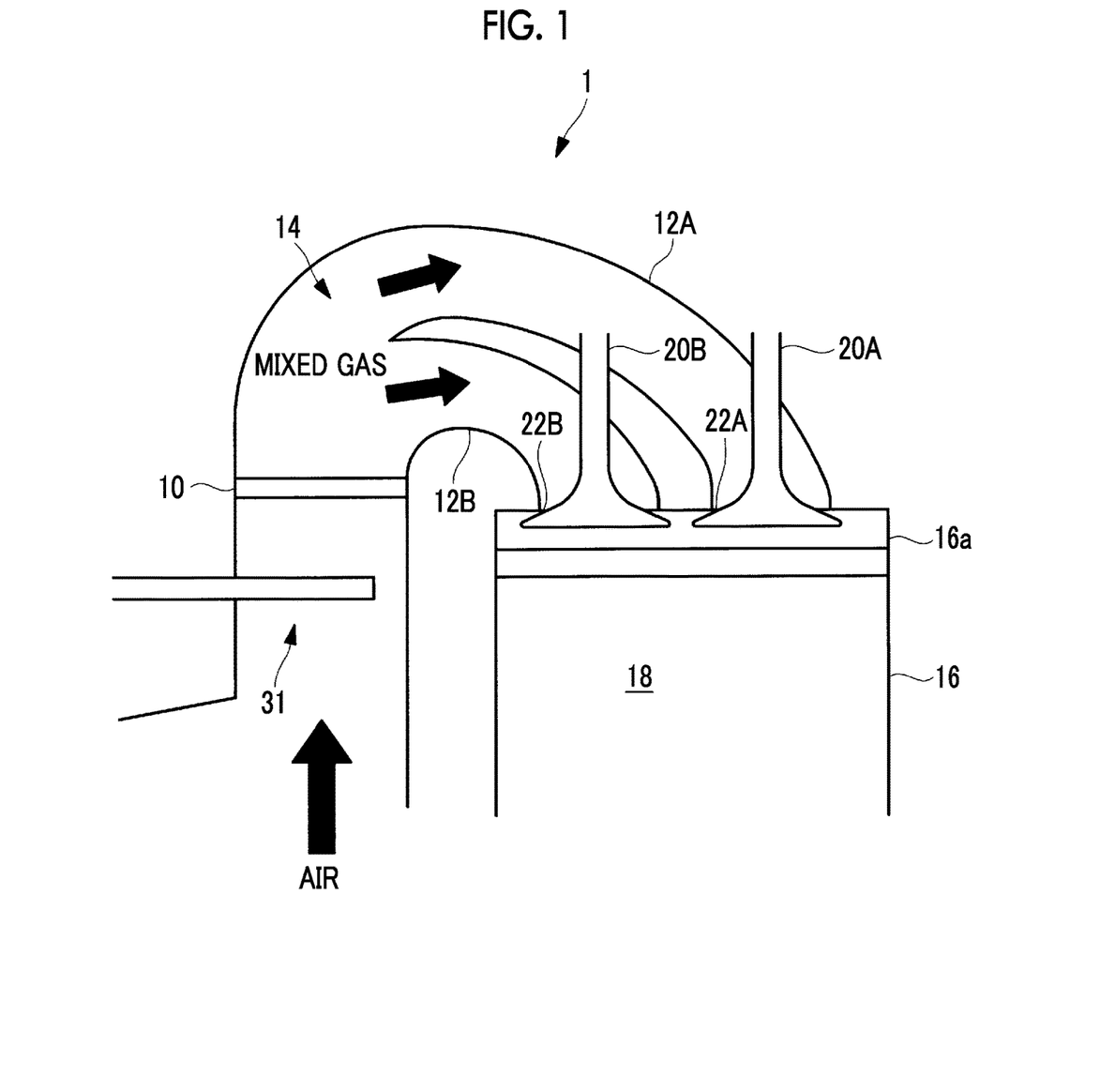
FIG. 1 is a longitudinal sectional view illustrating a configuration in the vicinity of a cylinder of a gas engine according to a first embodiment of the present invention.

FIG. 1 illustrates a configuration in the vicinity of a cylinder 16 included in the gas engine 1. The cylinder 16 has a cylindrical shape, and a cylinder head 16a is attached to an upper portion thereof. A piston (not illustrated) that reciprocates and slides inside the cylinder 16 is accommodated inside the cylinder 16. In addition, the cylinder 16 internally has a combustion chamber 18 defined by an inner wall of the cylinder 16 and the piston.

Figure 2:
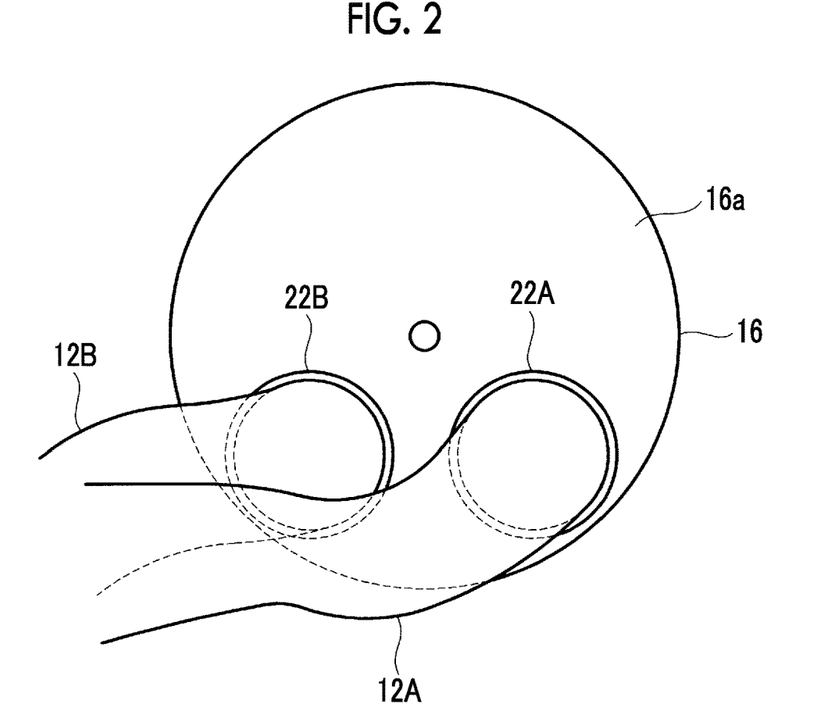
FIG. 2 is a plan view of a cylinder head of the gas engine according to the first embodiment of the present invention.

One end (end portion on a downstream side of a gas flow) of curved intake pipes 12A and 12B communicating with an intake air channel 10 (to be described later) is connected to intake ports 22A and 22B disposed in an upper portion of the cylinder head 16a attached to the cylinder 16 (refer to FIG. 2).

Intake valves 20A and 20B having an outer shape of a funnel are installed in connecting portions between the intake ports 22A and 22B of the cylinder head 16a and the intake pipes 12A and 12B. The intake valves 20A and 20B are biased to an upper side illustrated in FIG. 1 by a mechanism (not illustrated) so that a tapered portion having a funnel shape blocks the intake ports 22A and 22B disposed in the cylinder head 16a from a lower side illustrated in FIG. 1. However, if necessary (for example, when air is taken to the cylinder 16), the intake valves 20A and 20B are pushed down into the cylinder 16. In this manner, the intake pipes 12A and 12B can communicate with the combustion chamber 18.

The intake air channel 10 forms an air channel extending in an upward-downward direction illustrated in FIG. 1. In addition, fuel jetting means 31 for jetting the fuel gas is installed inside the intake air channel 10.

As illustrated in FIG. 1, the intake pipes 12A and 12B are formed as the air channel having a curved pipe shape in which the intake air channel 10 is branched in a branching portion 14 in two directions. In the present embodiment, the intake pipe having a longer path illustrated in FIG. 1 is the intake pipe 12A, and the intake pipe having a shorter path is the intake pipe 12B.

Next, the fuel jetting means 31 will be described.

In the present embodiment, the fuel jetting means 31 for jetting the fuel gas into the intake air channel 10 can jet respectively different amounts of the fuel gas to the intake pipe 12A and the intake pipe 12B.

Hereinafter, the fuel jetting means 31 will be described in detail.

Figure 3:
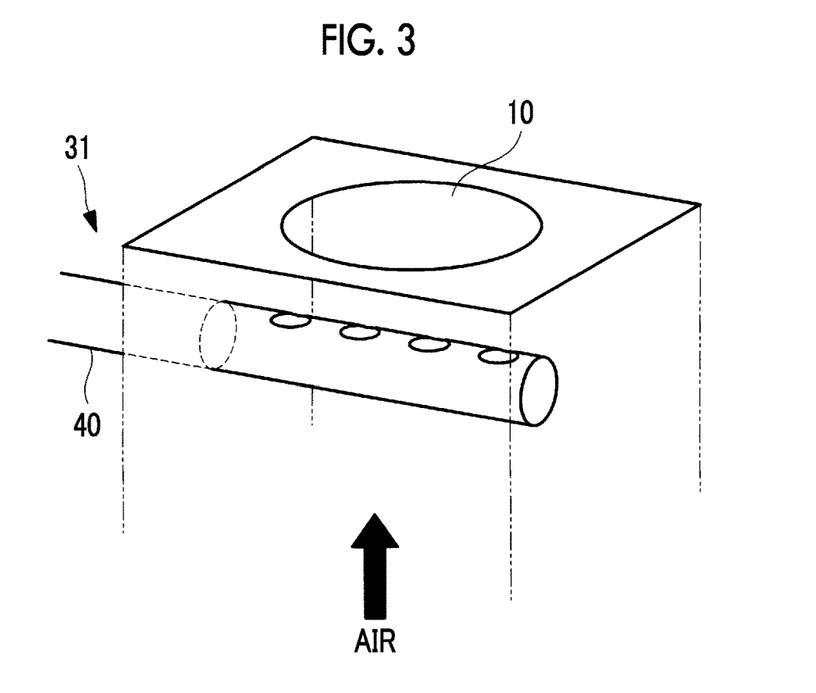
FIG. 3 is a perspective view of an intake air channel included in the gas engine according to the first embodiment of the present invention.
Figure 4:
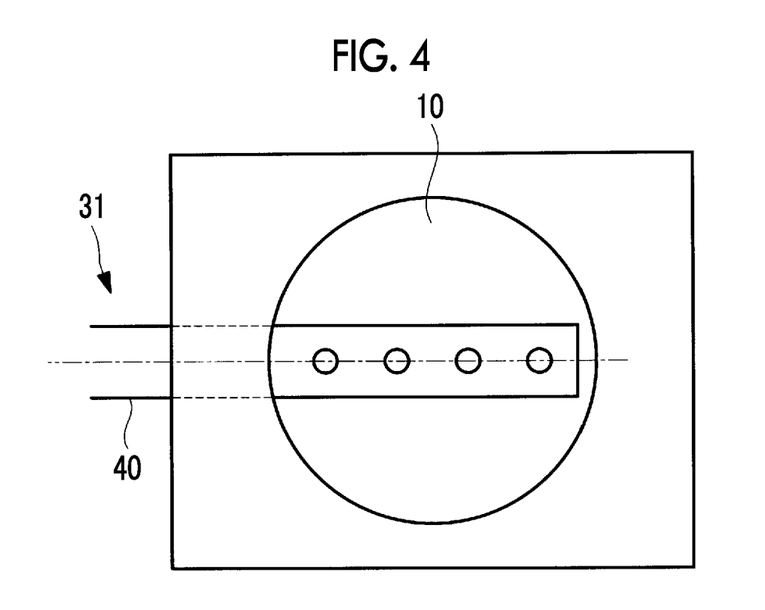
FIG. 4 is a plan view of FIG. 3.

As illustrated in FIGS. 3 and 4, the fuel jetting means 31 includes one jetting pipe 40. The jetting pipe is inserted to be perpendicular to the intake air channel 10 along an axial direction so that the jetting pipe 40 is located in the vicinity of the center inside the intake air channel 10.

Figure 5A:
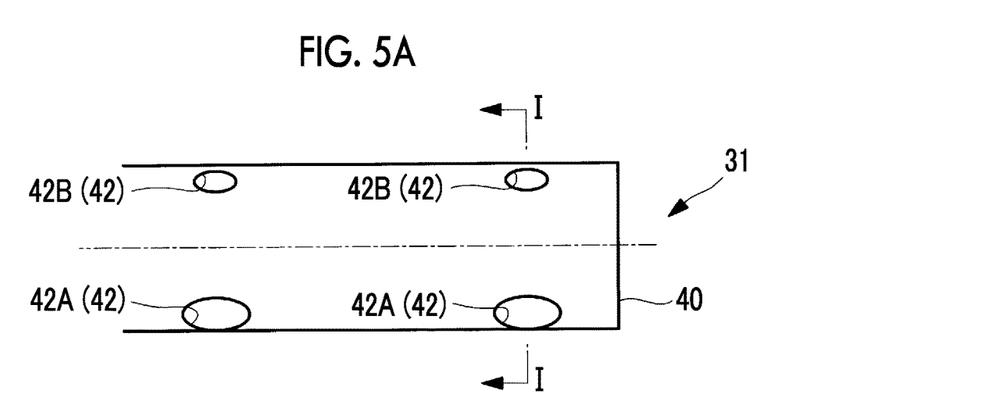
FIG. 5A is a plan view of a jetting pipe included in the gas engine according to the first embodiment of the present invention.
Figure 5B:
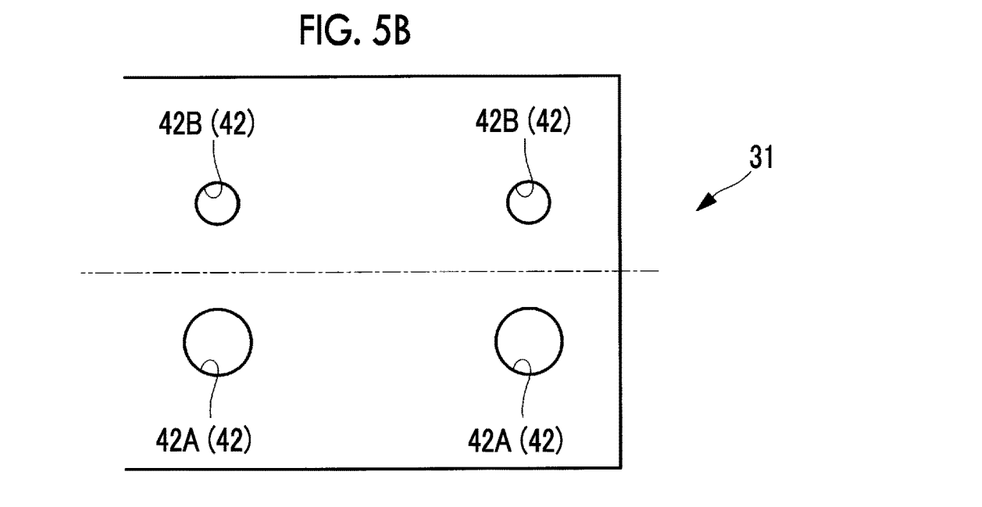
FIG. 5B is a developed view.
Figure 5C:
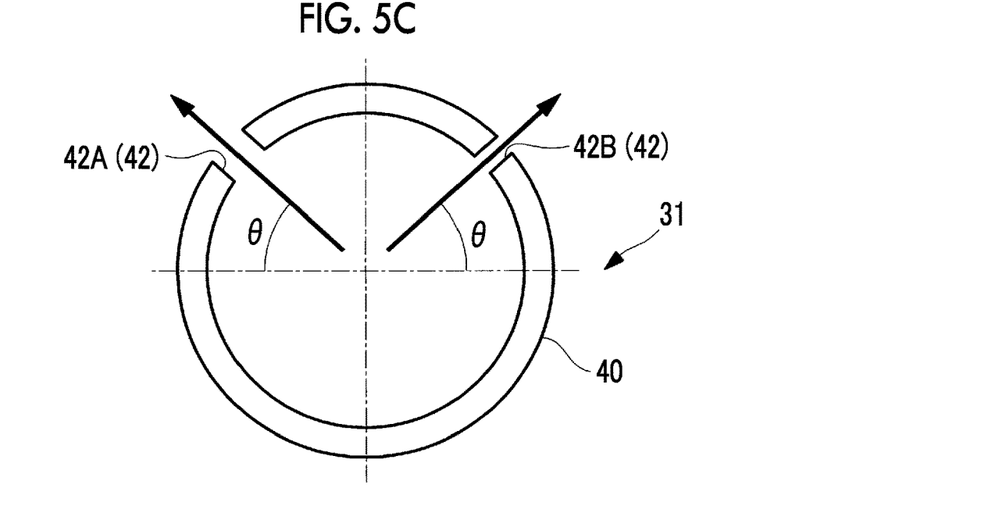
FIG. 5C is a longitudinal sectional view taken along line I-I.

As illustrated in FIGS. 5A, 5B, and 5C, the jetting pipe 40 has a plurality of jetting ports 42 bored to be respectively directed in two directions, in two rows in the axial direction and symmetrically with respect to the axis (refer to an angle θ formed with respect to a horizontal plane illustrated in FIG. 5C). In a case of FIGS. 5A, 5B), and 5C, the plurality of jetting ports directed in one direction are set as jetting ports 42A, and the plurality of jetting ports directed in the other direction are set as jetting ports 42B. The number of the jetting ports 42A and the number of the jetting ports 42B are the same as each other. In addition, areas of the plurality of jetting ports 42A are all the same, and areas of the plurality of jetting ports 42B are all the same. For example, the one direction described here is a direction to the gas flowing toward the intake pipe 12A, and for example, the other direction is a direction to the gas flowing toward the intake pipe 12B.

An area of an opening of the jetting port 42A is set to be larger than an area of an opening of the jetting port 42B. In addition, as described above, the number of the jetting ports 42A and the number of the jetting ports 42B are the same as each other. In addition, as described above, areas of the plurality of jetting ports 42A are all the same, and areas of the plurality of jetting ports 42B are all the same. In this manner, a total area of the plurality of jetting ports 42A directed in one direction is different from a total area of the plurality of jetting ports 42B directed in the other direction. In other words, the total area of the plurality of jetting ports 42A directed to the gas flowing toward the intake pipe 12A is larger than the total area of the plurality of jetting ports 42B directed to the gas flowing toward the intake pipe 12B. That is, much more fuel gas can be jetted to the gas flowing toward the intake pipe 12A.

In the above description, the total area of the plurality of jetting ports 42A directed to the gas flowing toward the intake pipe 12A is set to be larger than the total area of the plurality of jetting ports 42B directed to the gas flowing toward the intake pipe 12B. However, a configuration is not particularly limited to a combination thereof. In practice, the total area of the plurality of jetting ports directed to the intake pipe having a high flow speed may be larger than the total area of the plurality of jetting ports directed in the other direction. The reason is apparent from the following fact. When the gas flow speed is high, the amount of the fuel gas flowing per unit time, that is, the amount of required fuel gas increases.

Next, the gas flow of the gas engine 1 according to the present embodiment will be described.

An intercooler (not illustrated) is installed below the intake air channel 10 illustrated in FIG. 1. The air cooled by the intercooler flows inside the intake air channel 10 from below the intake air channel 10, and flows toward the branching portion 14 side located above. In this case, the fuel gas is jetted from the fuel jetting means 31 inserted into the intake air channel 10 toward the air flowing inside the intake air channel 10. The air and the fuel gas jetted toward the air reach the branching portion 14, and thereafter, are guided to the intake pipe 12A and the intake pipe 12B.

As described above, the total area of the plurality of jetting ports 42A directed to the gas flowing toward the intake pipe 12A is larger than the total area of the plurality of jetting ports 42B directed to the gas flowing toward the intake pipe 12B. Accordingly, much more fuel gas is jetted to the gas flowing toward the intake pipe 12A, and much less fuel gas is jetted to the gas flowing toward the intake pipe 12B.

The air and the fuel gas are gradually mixed with each other as the air and the fuel gas flow inside the intake air channel 10 and inside the intake pipes 12A and 12B. The mixed gas progressively mixed inside the intake pipes 12A and 12B is guided to the combustion chamber 18 when the intake valves 20A and 20B are pushed down and the intake ports 22A and 22B are in an open state. In this case, shapes of flow paths are different from each other between the intake pipe 12A and the intake pipe 12B. Accordingly, the flow speeds of the mixed gas flowing therethrough are different from each other between the intake pipe 12A and the intake pipe 12B. Therefore, even inside the intake air channel 10, the flow speed of the mixed gas directed to the intake pipe 12A and the flow speed of the mixed gas directed to the intake pipe 12B are different from each other. Here, it is assumed that the flow speed of the mixed gas flowing inside the intake pipe 12A is higher than the flow speed of the mixed gas flowing inside the intake pipe 12B. That is, it is assumed that the flow speed of the mixed gas directed to the intake pipe 12A is higher than the flow speed of the mixed gas directed to the intake pipe 12B inside the intake air channel 10.

The mixed gas of the air and the fuel gas is guided to the combustion chamber 18 after flowing through each of the intake pipes 12A and 12B. The mixed gas is ignited and combusted by an ignition device (not illustrated). At this time, in a case where the mixed gas guided from each of the intake pipes 12A and 12B has variations in fuel concentration, the mixed gas is not uniformly combusted in the combustion chamber 18. Therefore, there are possibilities of NOx generation, knocking generation, and an increase in non-combusted fuel gas.

The present embodiment achieves the following advantageous effects.

The fuel jetting means 31 is disposed upstream of the branching portion 14 in the gas flow direction. According to this configuration, compared to a case where the fuel is directly jetted to each of the intake pipes 12A and 12B located downstream of the intake air channel 10, a distance in which the air and the fuel gas can be mixed with each other is lengthened, and the air and the fuel gas are uniformly and easily mixed with each other.

In addition, the fuel jetting means 31 can jet respectively different amounts of the fuel to the plurality of intake pipes 12A and 12B. For example, in a case where the flow speed of the mixed gas directed to the intake pipe 12A is higher than the flow speed of the mixed gas directed to the intake pipe 12B inside the intake air channel 10, the total area of the jetting ports 42A directed in the direction of the gas flowing toward the intake pipe 12A can be larger than the total area of the jetting ports 42B directed in the direction of the gas flowing toward the intake pipe 12B. In this manner, the amount of the fuel can be increased for the intake pipe 12A having the high flow speed of the mixed gas of the air and the fuel gas, and the amount of the fuel can be decreased for the intake pipe 12B having the low flow speed of the gas. In this manner, the fuel concentration of the mixed gas to be supplied to the combustion chamber 18 via each of the intake pipes 12A and 12B can be uniform regardless of the intake pipes 12A and 12B. Therefore, the mixed gas of the air and the fuel gas can be uniformly combusted in the combustion chamber 18. Therefore, it is possible to suppress phenomena such as NOx generation, knocking generation, and an increase in non-combusted fuel gas.

Second Embodiment

Hereinafter, a second embodiment according to the present invention will be described with reference to FIG. 6. The present embodiment is different from the first embodiment in a form of the fuel jetting means, and other points are the same as each other. Therefore, only the points different from those according to the first embodiment will be described. The same reference numerals will be assigned to the same elements, and description thereof will be omitted.

Figure 6A:
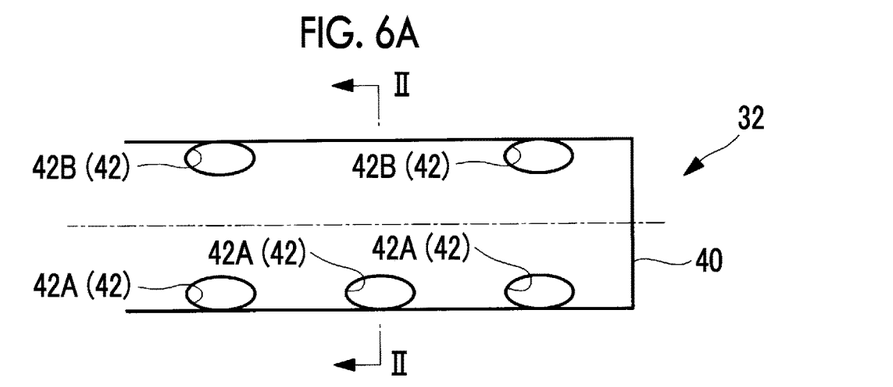
FIG. 6A is a plan view of a jetting pipe included in a gas engine according to a second embodiment of the present invention.
Figure 6B:
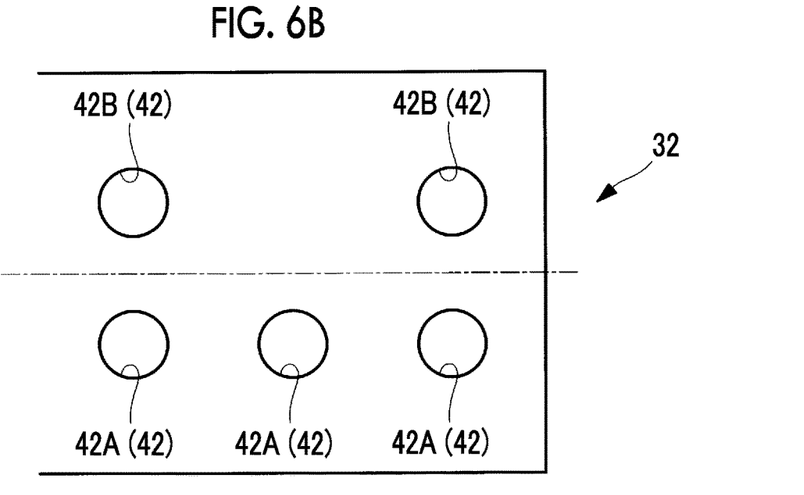
FIG. 6B is a developed view.
Figure 6C:
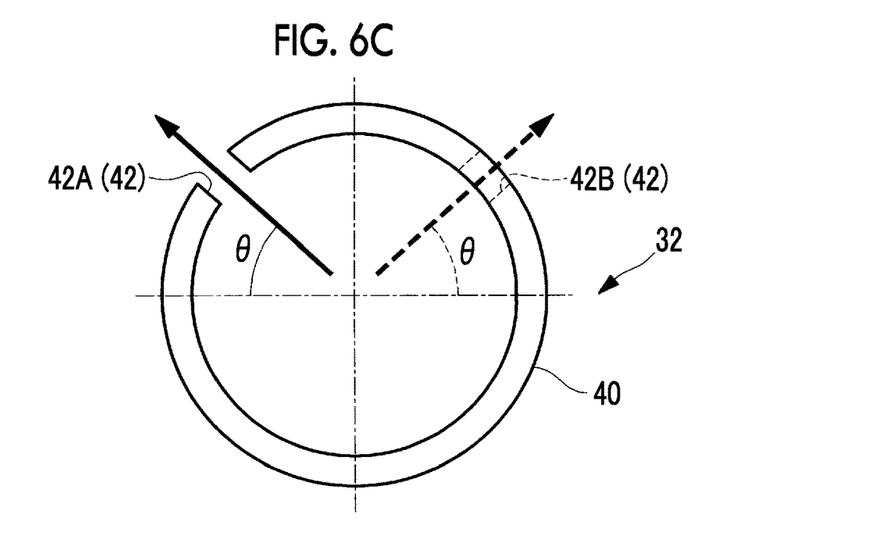
FIG. 6C is a longitudinal sectional view taken along line II-II.

As illustrated in FIGS. 6A, 6B, and 6C, the jetting pipe 40 included in fuel jetting means 32 has the plurality of jetting ports 42 bored to be respectively directed in two directions, in two rows in the axial direction and symmetrically with respect to the axis (refer to the angle θ formed with respect to a horizontal plane illustrated in FIG. 6C). In a case of FIGS. 6A, 6B, and 6C, the plurality of jetting ports directed in one direction are set as the jetting ports 42A, and the plurality of jetting ports directed in the other direction are set as the jetting ports 42B. One area of the jetting ports 42A and one area of the jetting ports 42B is the same as each other. For example, the one direction described here is a direction to the gas flowing toward the intake pipe 12A, and for example, the other direction is a direction to the gas flowing toward the intake pipe 12B.

The jetting ports 42A and 42B are bored so that the number of jetting ports 42A is larger than the number of jetting ports 42B. In addition, as described above, one area of the jetting ports 42A and one area of the jetting ports 42B is the same as each other. In this manner, a total area of the plurality of jetting ports 42A directed in one direction is different from a total area of the plurality of jetting ports 42B directed in the other direction. In other words, the total area of the plurality of jetting ports 42A directed to the gas flowing toward the intake pipe 12A is larger than the total area of the plurality of jetting ports 42B directed to the gas flowing toward the intake pipe 12B. That is, much more fuel gas can be jetted to the gas flowing toward the intake pipe 12A.

In the above description, the total area of the plurality of jetting ports 42A directed to the gas flowing toward the intake pipe 12A is set to be larger than the total area of the plurality of jetting ports 42B directed to the gas flowing toward the intake pipe 12B. However, a configuration is not particularly limited to a combination thereof. In practice, the total area of the plurality of jetting ports directed to the intake pipe having a high flow speed may be larger than the total area of the plurality of jetting ports directed in the other direction. The reason is apparent from the following fact. When the gas flow speed is high, the amount of the fuel gas flowing per unit time, that is, the amount of required fuel gas increases. Here, it is assumed that the flow speed of the mixed gas flowing inside the intake pipe 12A is higher than the flow speed of the mixed gas flowing inside the intake pipe 12B. That is, it is assumed that the flow speed of the mixed gas directed to the intake pipe 12A is higher than the flow speed of the mixed gas directed to the intake pipe 12B inside the intake air channel 10.

The present embodiment achieves the following advantageous effects.

In a case where the flow speed of the mixed gas directed to the intake pipe 12A is higher than the flow speed of the mixed gas directed to the intake pipe 12B inside the intake air channel 10, the total area of the jetting ports 42A directed in the direction of the gas flowing toward the intake pipe 12A can be larger than the total area of the jetting ports 42B directed in the direction of the gas flowing toward the intake pipe 12B. In this manner, the amount of the fuel can be increased for the intake pipe 12A having the high flow speed of the mixed gas of the air and the fuel gas, and the amount of the fuel can be decreased for the intake pipe 12B having the low flow speed of the gas. In this manner, the fuel concentration of the mixed gas to be supplied to the combustion chamber 18 via each of the intake pipes 12A and 12B can be uniform regardless of the intake pipes 12A and 12B. Therefore, the mixed gas of the air and the fuel gas can be uniformly combusted in the combustion chamber 18. Therefore, it is possible to suppress phenomena such as NOx generation, knocking generation, and an increase in non-combusted fuel gas.

Third Embodiment

Figure 7:
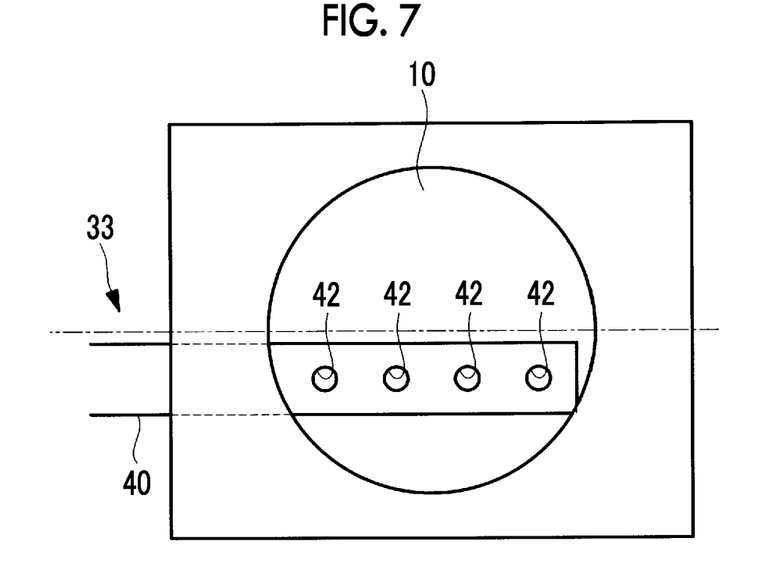
FIG. 7 is a plan view of an intake air channel included in a gas engine according to a third embodiment of the present invention.

Hereinafter, a third embodiment according to the present invention will be described with reference to FIG. 7. The present embodiment is different from the first and second embodiments in a form of the fuel jetting means, and other points are the same as each other. Therefore, only the points different from those according to the first and second embodiments will be described. The same reference numerals will be assigned to the same elements, and description thereof will be omitted.

Fuel jetting means 33 includes a single jetting pipe 40 having a plurality of jetting ports 42 bored in a row in the axial direction. In addition, the jetting pipe 40 is disposed close to flowing gas having the higher flow speed, out of the gas flowing toward the intake pipe 12A and the gas flowing toward the intake pipe 12B.

Here, it is assumed that the flow speed of the mixed gas flowing toward the intake pipe 12A is higher than the flow speed of the mixed gas flowing toward the intake pipe 12B. Furthermore, it is assumed that the gas mainly flows toward the intake pipe 12A below the axis extending rightward and leftward inside the intake air channel 10 illustrated in FIG. 7. Therefore, in FIG. 7, the jetting pipe 40 is disposed in the intake air channel 10 (intake air channel 10 below the axis extending rightward and leftward) through which the gas mainly flowing toward the intake pipe 12A flows.

The present embodiment achieves the following advantageous effects.

The jetting pipe 40 is disposed close to the gas flow having the high flow speed, out of the gas flows directed to the plurality of intake pipes 12A and 12B. In this manner, the amount of the fuel can be increased for the intake pipe 12A having the high gas flow speed, and the amount of the fuel can be decreased for the intake pipe 12B having the low gas flow speed. In this manner, the fuel concentration of the mixed gas to be supplied to the combustion chamber 18 via each of the intake pipes 12A and 12B can be uniform regardless of the intake pipes 12A and 12B. Therefore, the mixed gas of the air and the fuel gas can be uniformly combusted in the combustion chamber 18. Therefore, it is possible to suppress phenomena such as NOx generation, knocking generation, and an increase in non-combusted fuel gas.

Figure 8A:
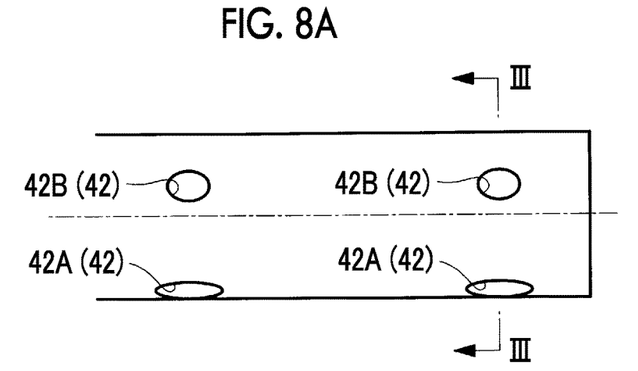
FIG. 8A is a plan view of a jetting pipe rotated around an axis.
Figure 8B:
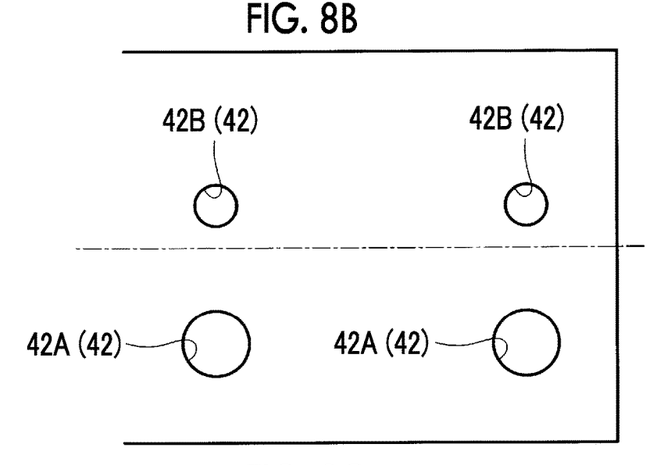
FIG. 8B is a developed view.
Figure 8C:
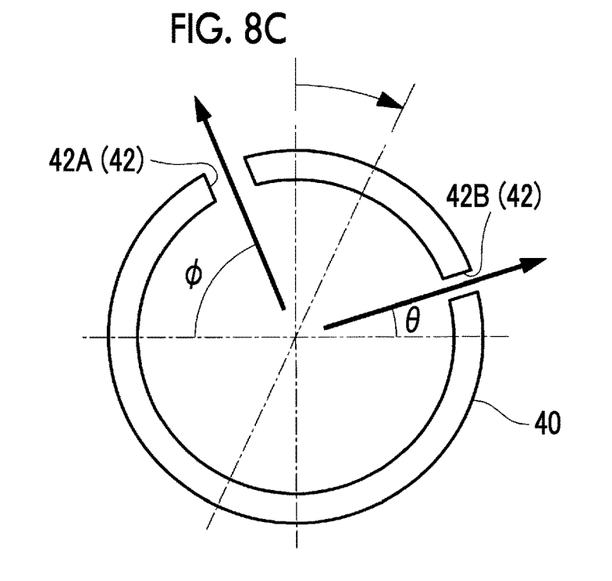
FIG. 8C is a longitudinal sectional view taken along line III-III.
Figure 9:
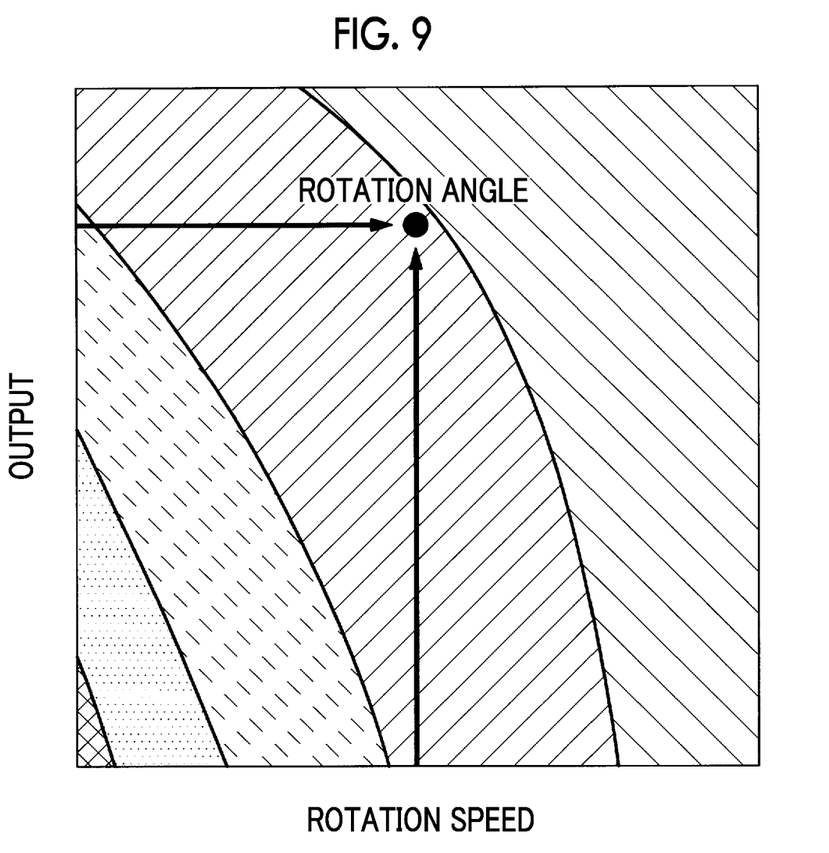
FIG. 9 is a view illustrating an example of a map based on a rotation speed and an output.

The fuel jetting means 31, 32, and 33 according to the first to third embodiments may include a rotation mechanism (not illustrated) rotatable around the axis of the jetting pipe 40 (refer to FIG. 8). In this manner, the fuel gas can be jetted in an optimum direction that promotes the air and the fuel gas to be mixed with each other. In this case, it is preferable that the rotation mechanism is driven by a servomotor that can optionally adjust a rotation angle of the jetting pipe 40 and can acquire information on the rotation angle. For example, the rotation angle is uniquely determined by a control unit (not illustrated) from an actual output and an actual rotation speed of the gas engine 1, based on a map (refer to FIG. 9) of the output and the rotation speed of the gas engine 1 which are prepared from data obtained in advance.

In addition, it is preferable that the jetting port bored in the jetting pipe 40 included in the fuel jetting means 31, 32, and 33 according to the first to third embodiments is formed to face the downstream side in the gas flow direction. Specifically, a range of the angle $\theta$ or $\varphi$ formed with respect to the horizontal plane illustrated in FIGS. 5C, 6C, and 8C may be 0° to 90°. According to this configuration, when the gas engine 1 has a low output, even in a case where the gas flows rearward from the cylinder 16 side, the fuel gas to be jetted from the plurality of jetting ports 42 is not jetted to the upstream side of the gas. Therefore, the fuel gas jetted from the plurality of jetting ports 42 are less likely to flow rearward to the upstream side. In this manner, it is possible to prevent the fuel gas from flowing rearward to the intercooler (not illustrated) installed on the downstream side of the gas.

In addition, the configurations of the fuel jetting means 31, 32, and 33 according to the first to third embodiments can be respectively combined with each other. For example, the jetting pipe 40 included in the fuel jetting means 31 according to the first embodiment may be disposed close to the gas having the high flow speed, as in the fuel jetting means 33 according to the third embodiment.

In view of a disposition relationship with other components (not illustrated) configuring the gas engine 1, in a case where the intake pipes 12A and 12B can be symmetrically disposed toward the intake ports 22A and 22B and the flow speed is uniform after the intake pipes 12A and 12B are branched, the amounts of the fuel to be jetted from the jetting ports 42A and 42B do not need to vary depending on the intake pipes 12A and 12B, and the same amount of the fuel may be jetted.

REFERENCE SIGNS LIST

1: gas engine
10: intake air channel 12A, 12B: intake pipe
14: branching portion
16: cylinder
16a: cylinder head
18: combustion chamber
20A, 20B: intake valve
22A, 22B: intake port
31, 32, 33: fuel jetting means
40: jetting pipe
42 (42A, 42B): jetting port

The invention claimed is:

1. A gaseous-fueled engine comprising:
an intake air channel forming an air channel through which air flows;
first and second intake pipes in which the intake air channel is branched at a branching portion, the first and second intake pipes being located downstream in a flow direction with respect to the branching portion and being open to a cylinder in a downstream end; and
fuel injecting means for injecting fuel into the intake air channel,
wherein the first and second intake pipes are designed so that, in the intake air channel, an air flow directed toward the first intake pipe is faster than an air flow directed toward the second intake pipe, and
the fuel injecting means is disposed upstream of the branching portion in the gas flow direction, and is designed to inject different amounts of the fuel into the first and second intake pipes, so that an amount of the fuel injected into the first intake pipe is larger than an amount of the fuel injected into the second intake pipe and a concentration of the mixed gas of air and fuel to be supplied via the first intake pipe to the cylinder and a concentration of the mixed gas of air and fuel to be supplied via the second intake pipe to the cylinder are made uniform.

2. The gaseous-fueled engine according to claim 1,
wherein the fuel injecting means includes a single injecting pipe having injecting ports formed in a first row and second injecting ports formed in a second row, and
each port has an opening area and a total opening area of the first injecting ports directed in a direction toward the first intake pipe is different from a total opening area of the second injecting ports directed toward the second intake pipe.

3. The gaseous-fueled engine according to claim 2,
wherein in the plurality of injecting ports belonging to the injecting pipe, the first injecting ports directed in the direction toward the first intake pipe have the same area that is different from the same opening area of the second injecting ports directed in the direction toward the second intake pipe.

4. The gaseous-fueled engine according to claim 3,
wherein the fuel injecting means includes a rotation mechanism configured to rotate the injecting pipe around an axis.

5. The gaseous-fueled engine according to claim 3,
wherein the plurality of injecting ports are formed toward a downstream side in the gas flow direction.

6. The gaseous-fueled engine according to claim 2,
wherein the first and second injecting ports have the same opening area, and the number of the first injecting ports directed in the direction toward the first intake pipe is different from the number of the second injecting ports directed in the direction toward the second intake pipe.

7. The gaseous-fueled engine according to claim 6,
wherein the fuel injecting means includes a rotation mechanism configured to rotate the injecting pipe around an axis.

8. The gaseous-fueled engine according to claim 6,
wherein the plurality of injecting ports are formed toward a downstream side in the gas flow direction.

9. The gaseous-fueled engine according to claim 2,
wherein the fuel injecting means includes a rotation mechanism configured to rotate the injecting pipe around an axis.

10. The gaseous-fueled engine according to claim 2,
wherein the plurality of injecting ports are formed toward a downstream side in the gas flow direction.

11. A ship comprising:
the gaseous-fueled engine according to claim 1.

* * * * *